US012752614B2

(12) United States Patent
Eto

(10) Patent No.: US 12,752,614 B2
(45) Date of Patent: Oct. 6, 2026

(54) TIRE COVER FOR WHEELCHAIR

(71) Applicant: TOYOTA JIDOSHA KABUSHIKI KAISHA, Toyota (JP)

(72) Inventor: Yoshitaka Eto, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 18/408,119

(22) Filed: Jan. 9, 2024

(65) Prior Publication Data

US 2024/0239168 A1 Jul. 18, 2024

(30) Foreign Application Priority Data

Jan. 12, 2023 (JP) ................................ 2023-002797

(51) Int. Cl.

| | |
|---|---|
| ***B60J 11/10*** | (2006.01) |
| ***A61G 5/10*** | (2006.01) |
| ***B60C 19/00*** | (2006.01) |

(52) U.S. Cl.

CPC ............... *B60J 11/10* (2013.01); *B60C 19/00* (2013.01); *A61G 5/10* (2013.01)

(58) Field of Classification Search

CPC ............. B60J 11/00; B60C 19/00; A61G 5/10

See application file for complete search history.

(56) References Cited

U.S. PATENT DOCUMENTS

| | | | | |
|---|---|---|---|---|
| 1,482,892 A * | 2/1924 | Goehner | B65D 85/06 | 224/42.2 |
| 1,947,145 A * | 2/1934 | Zerk | B65D 85/06 | 206/304 |
| 6,439,281 B1 * | 8/2002 | Hogg | A61G 5/10 | 152/217 |
| 2006/0170276 A1 * | 8/2006 | Szeg, III | B60P 3/122 | 301/37.42 |

FOREIGN PATENT DOCUMENTS

| | | | |
|---|---|---|---|
| JP | S63-184019 U | 11/1988 | |
| JP | 3113804 U | 9/2005 | |
| JP | 2010-036595 A | 2/2010 | |
| JP | 5432351 B1 * | 3/2014 | |
| JP | 2019-084364 A | 6/2019 | |
| JP | 6816245 B1 | 1/2021 | |
| KR | 200320512 Y1 | 7/2003 | |
| KR | 101252426 B1 * | 4/2013 | B62J 99/00 |
| KR | 101926299 B1 * | 12/2018 | B60C 7/26 |

OTHER PUBLICATIONS

Panthera AB, Tyre reTyre Traction, Supplemental Material for Tire Covers, panthera-japan.jp, https://www.panthera.se/en/delar_dack_retyre.html, May 11, 2021.

* cited by examiner

*Primary Examiner* — Jacob D Knutson

(74) *Attorney, Agent, or Firm* — Dinsmore & Shohl LLP

(57) ABSTRACT

The tire cover covers a tire of the wheelchair from outside in the radial direction. The tire cover comprises a plurality of cover pieces, each of which has an arc shape. An opening groove is formed on an inner circumferential side of each of (Continued)

the plurality of cover pieces. A sliding surface and a friction surface are formed on an inner surface of the opening groove. The sliding surface is formed near an opening end. The friction surface is formed on a bottom surface of the opening groove such that the sliding surface is nearer to the opening end than the friction surface is to the opening end.

10 Claims, 9 Drawing Sheets

TIRE COVER FOR WHEELCHAIR

CROSS REFERENCE TO RELATED APPLICATION

This application claims priority to Japanese Patent Application No. 2023-002797, filed on Jan. 12, 2023, which is incorporated herein by reference in its entirety including the specification, claims, drawings, and abstract.

BACKGROUND

A tire cover for a wheelchair is disclosed herein.

When the wheelchair moves from outdoors to indoors, a hallway may be dirty by mud or the like attached to the tire. JP S63-184019 U, JP 3113804 U, and JP 2019-84364 A discloses a cover attached to a tire. For example, a cover is attached to a tire of a wheelchair at an entrance of a building. In JP 5432351 B, a tire cover is disclosed. The tire cover is divided into a plurality of divided bodies. Each of the divided bodies has an arc shape in a side view.

When the tire idles with respect to the tire cover, it becomes difficult to advance the wheelchair. Therefore, the inner surface of the tire cover in which the tire is accommodated may be a rough surface. However, in this case, when the tire cover is mounted on the tire, the tire cover may get stuck on the tire, and the mounting operation becomes complicated.

Thus, the present specification discloses a tire cover for a wheelchair. The tire cover improves the attachability of the tire cover to the tire. In addition, idle rotation of the tire with respect to the tire cover can be suppressed.

SUMMARY

A tire cover for a wheelchair is disclosed herein. The tire cover covers a tire of the wheelchair from outside in the radial direction. The tire cover comprises a plurality of cover pieces, each of which has an arc shape. An opening groove is formed on an inner circumferential side of each of the plurality of cover pieces. The opening groove extends along a circumferential direction, and the opening groove accommodates the tire. A sliding surface and a friction surface are formed on an inner surface of the opening groove. The sliding surface is formed near an opening end. The friction surface is formed on a bottom surface of the opening groove such that the sliding surface is nearer to the opening end than the friction surface is to the opening end. And the friction surface has a higher coefficient of friction than the sliding surface.

According to the above configuration, when the cover piece is mounted on the tire, a portion of the inner surface of the cover piece which comes into contact with the side surface of the tire is a sliding surface. This enables smooth mounting. Further, the friction surface of the cover piece comes into contact with the ground contact surface of the tire.

As a result, idle rotation of the tire with respect to the tire cover is suppressed. In this specification, the sum of the arc lengths of the plurality of cover pieces may exceed the circumferential length of the tire. Each of the plurality of cover pieces comprises a body portion and two joint portions. The body portion extends in a circumferential direction. The two joint portions are disposed at respective circumferential ends of the body portion. The joint portion of a first cover piece and the joint portion of a second cover piece are overlapped and attached to the tire. And the joint portions of the first cover piece and the second cover piece are thinner than the body portions of the first cover piece and the second cover piece.

According to the above configuration, the difference between the thickness of the pair of joint portions and the thickness of the body portion can be reduced. Therefore, bump during traveling in a state in which the tire cover is mounted is suppressed.

In this specification, a step between the body portion and the joint portion may be formed on an outer surface of the first cover piece. And a step between the body portion and the joint portion is formed on an inner surface of the second cover piece.

According to the above configuration, the pair of cover pieces can be positioned by using the steps.

In this specification, a plurality of fasteners may be disposed on an outer surface of the joint portion of the first cover piece and an inner surface of the joint portion of the second cover piece, respectively.

According to the above configuration, positional displacement between the pair of cover pieces is suppressed.

In this specification, the opening groove may comprise a tire accommodating portion and a rim accommodating portion. A cross-sectional shape of the tire accommodating portion is an arc shape, and the cross-sectional shape is perpendicular to a circumferential direction of the opening groove. And the rim accommodating portion extends linearly from an end of the tire accommodating portion to the opening end.

When the air amount of the tire is insufficient, the tire is insufficiently held by the tire accommodating portion. As a result, the tire cover can be easily detached from the tire.

Accordingly, a portion for accommodating the rim of the wheel is provided as an extended portion of the tire accommodating portion. Thus, the tire cover can reliably hold the tire regardless of the air amount of the tire.

According to the tire cover for wheelchairs disclosed in the present specification, the detachability of the tire cover to the tire is improved. In addition, idle rotation of the tire with respect to the tire cover is suppressed.

DESCRIPTION OF EMBODIMENTS

Figure 1:
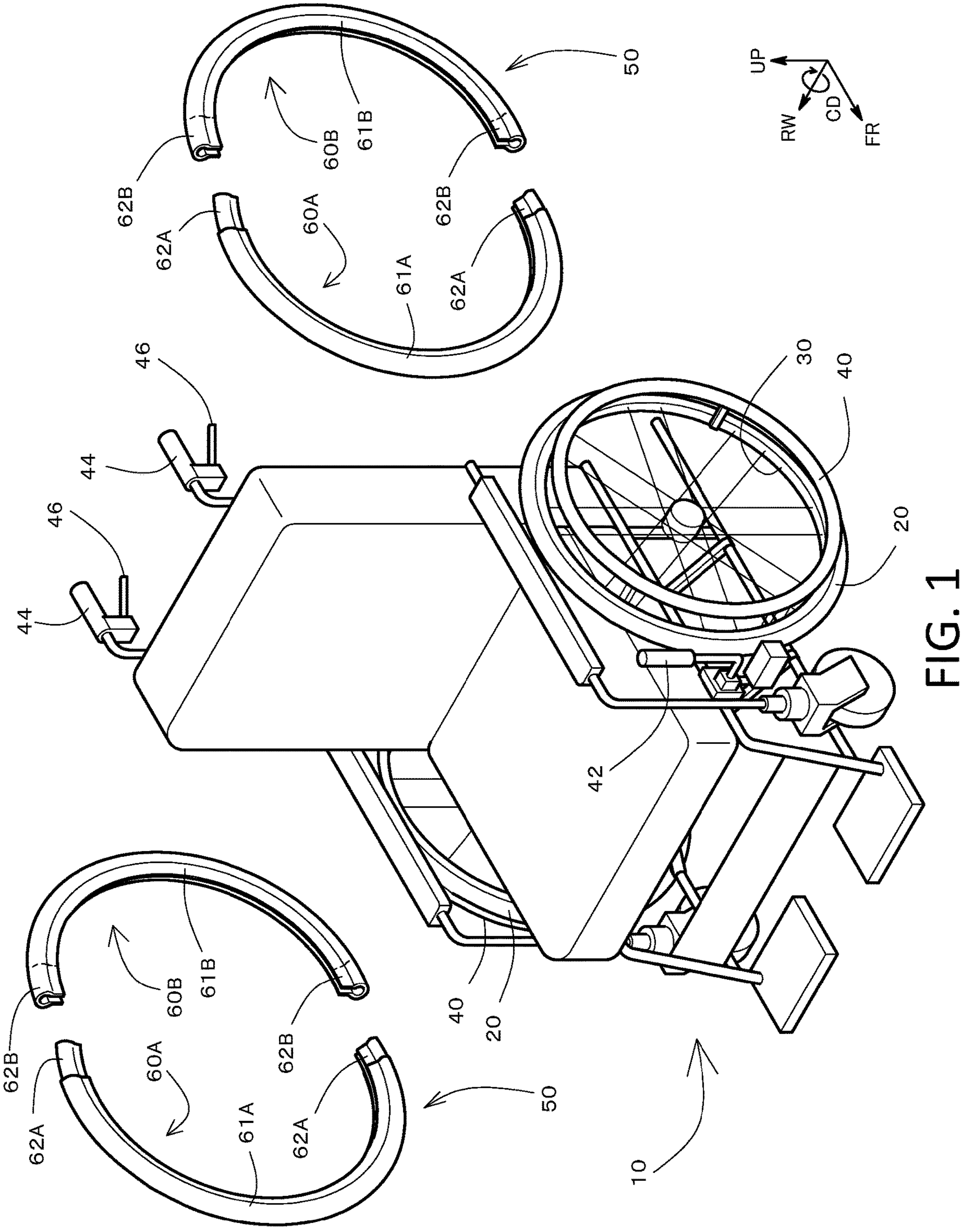
FIG. 1 is a perspective view showing an example of a wheelchair tire cover and a wheelchair according to the present embodiment.

Hereinafter, a tire cover for a wheelchair according to the present embodiment will be described with reference to the drawings. The shapes, materials, numbers, and numerical values described below are examples for explanation. This example can be appropriately changed according to the specifications of the wheelchair tire cover. In the following, the same reference numerals are given to the same elements in all the drawings.

In FIGS. 1 to 9, an orthogonal coordinate system including an FR axis, an RW axis, and an UP axis is used to represent the position and the direction of each component. The FR axis is a vehicle longitudinal axis whose positive direction is the front of the vehicle. The RW axis is a vehicle width direction axis whose positive direction is the right side of the vehicle. The UP axis is a vertical axis of the vehicle in which the upward direction is a positive direction.

Further, FIGS. 1-9 show the tire cover 50 and the circumferential direction CD of the tire 20 of the wheelchair 10. The circumferential direction CD has the RW axis as a rotation center axis.

Structure of Vehicle Chair

FIG. 1 shows an example of a tire cover 50 according to the present embodiment. FIG. 1 shows an example of a wheelchair 10 to which a tire cover 50 is mounted. The wheelchair 10 may be so-called self-propelled. For example, a hand rim 40 is disposed on the side of the tire 20. The hand rim 40 allows a user of the wheelchair to operate the wheelchair 10 by himself/herself. A toggle brake 42 is disposed in front of the tire 20. Further, the wheelchair 10 is provided with a hand-press handle 44 and a release brake 46 so that the wheelchair 10 can be operated by a caregiver.

Structures of tires and wheels

Figure 2:
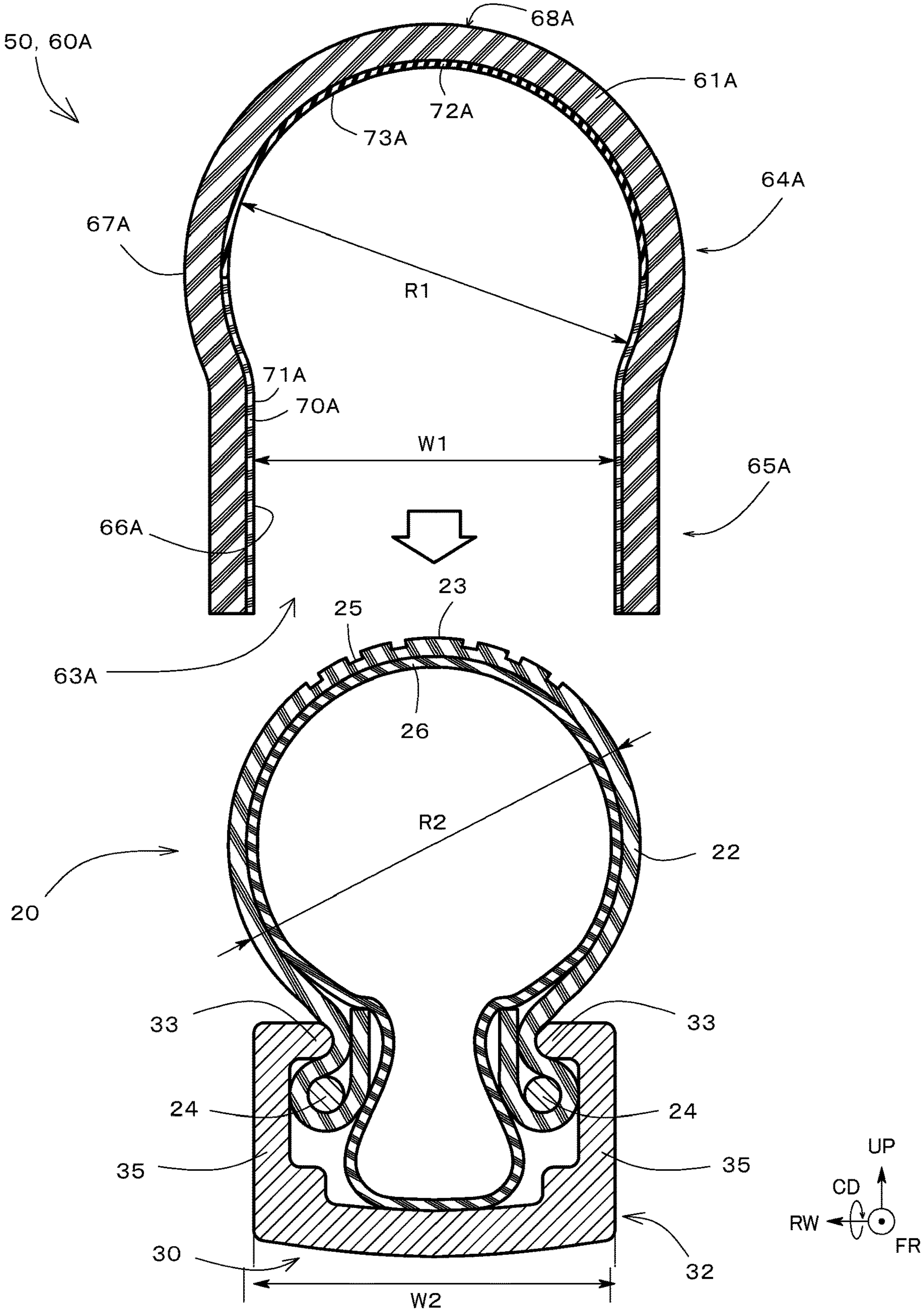
FIG. 2 is a cross-sectional view showing an example of a cross-sectional structure of a tire and a tire cover for a wheelchair according to the present embodiment. This figure is a cross-sectional view of the tire cover and the tire taken along a plane perpendicular to the circumferential direction of the tire cover and the tire.

The tire cover 50 is attached to the tire 20. FIG. 2 illustrates a cross-sectional view of the tire 20 and the wheel 30. FIG. 2 illustrates a so-called tube clincher type tire 20. However, the tire cover 50 according to the present embodiment is detachable from other types of tires 20.

The wheel 30 comprises a ring-shaped rim 32. The rim 32 has a substantially U-shaped cross section and includes a pair of side walls 35, 35. The side walls 35, 35 extend linearly along the radial direction of the wheel 30 (in the UP-axis direction in FIG. 2). Further, a flange 33 serving as a folded-back portion is formed at an end portion of the side wall 35.

The tire 20 includes a casing 22, a bead core 24, and an inner tube 26. The casing 22 is an outer part of the tire 20. The casing 22 has a substantially U-shaped cross section. The casing 22 includes, for example, a fiber layer and a rubber layer. The rubber layer covers the fibrous layer.

A ground contact surface 23 is provided on an outer surface (an exposed surface) of the casing 22. A tread pattern 25 is formed on the ground contact surface 23. An end portion of the casing 22 having a substantially U-shaped cross section is bent inward. The bent portion serves as a pocket into which the bead core 24 is inserted.

The bead core 24 is, for example, a metallic wire and extends along the inner circumference of the casing 22 over the entire circumference. When the bead core 24 is hooked to the flange 33 of the rim 32, the casing 22 is assembled to the rim 32.

An inner tube 26 is accommodated in the casing 22. The inner tube 26 includes a valve (not shown) for air. This valve is inserted into an opening (not shown) in rim 32. Air is filled from the valve into the inner tube 26, thereby increasing the air pressure of the tire 20.

Tire Cover

As illustrated in FIG. 1, a tire cover 50 can be attached to the tire 20 of the wheelchair 10. The tire cover 50 covers the tire 20 from the outside in the radial direction. For example, when the wheelchair moves from outdoors to indoors, the tire cover 50 is attached to the tire 20.

The tire cover 50 is divided into a plurality of cover pieces. For example, in FIG. 1, the tire cover 50 includes a pair of cover pieces 60A and 60B. However, the tire cover 50 may be composed of more pieces.

The cover pieces 60A and 60B are made of, for example, the same material as the casing 22 (see FIG. 2) of the tire 20. For example, the cover pieces 60A and 60B include a fiber layer and a rubber layer. The rubber layer covers the fiber layer.

The cover pieces 60A and 60B are arc-shaped parts. By mounting the cover pieces 60A and 60B on the tire 20, the radially outer surface of the tire 20, that is, the ground contact surface 23 is covered with the tire cover 50 over the entire circumference.

FIG. 2 illustrates a cross section of the cover piece 60A. This cross section is a cross section perpendicular to the circumferential direction of the tire 20. The structure of the cover piece 60A will be described below. However, when the sign suffix "A" is replaced with "B", the following description describes the structure of the cover piece 60B.

A ground plane 68A is formed on the outer surface 67A of the cover piece 60A. The ground plane 68A is formed, for example, on the radially outermost peripheral surface of the cover piece 60A.

Figure 3:
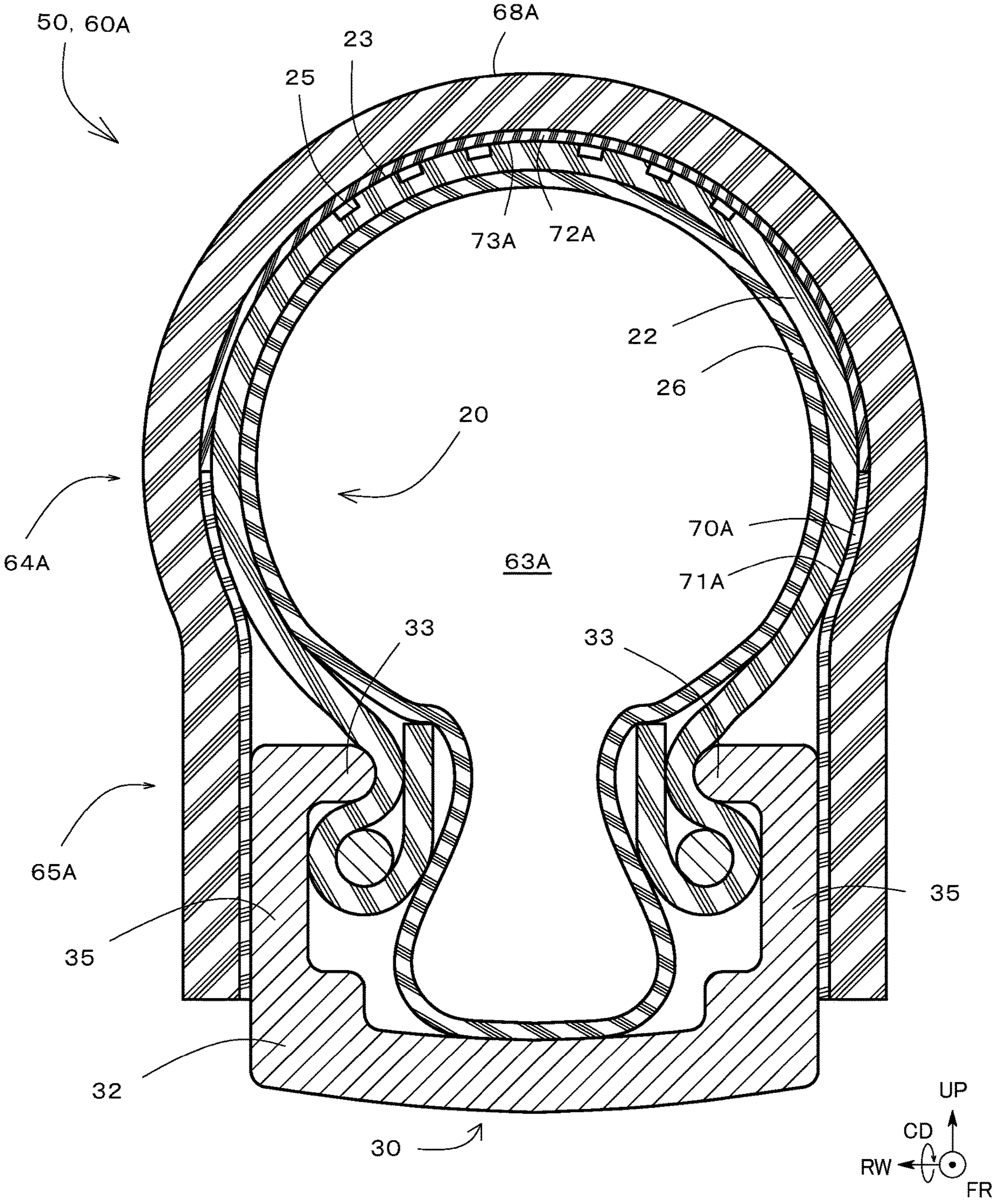
FIG. 3 is a cross-sectional view showing an example in which a wheelchair tire cover according to the present embodiment is attached to a tire. This figure is a cross-sectional view of the tire cover and the tire taken along a plane perpendicular to the circumferential direction of the tire cover and the tire.

An opening groove 63A is formed on the inner peripheral side of the cover piece 60A. The opening groove 63A is formed along the circumferential direction of the cover piece 60A. As illustrated in FIG. 3, the rim 32 of the tire 20 and the wheel 30 is accommodated in the opening groove 63A.

The opening groove 63A includes a tire accommodating portion 64A and a rim accommodating portion 65A. Along the cross-sectional shape of the tire 20, the cross section of the tire accommodating portion 64A has an arc shape. The cross section indicates a plane perpendicular to the circumferential direction of the tire 20 and the cover piece 60A. For example, as illustrated in FIG. 2, when the tire cover 50 is detached from the tire 20, the tire accommodating portion 64A is formed such that the diameter R1 of the inner peripheral surface of the cross section of the tire accommodating portion 64A is equal to the diameter R2 of the outer peripheral surface of the cross section of the casing 22.

A rim accommodating portion 65A is connected to an end portion of the tire accommodating portion 64A. Along the cross-sectional shape of the rim 32, the rim accommodating portion 65A extends linearly to the open end of the opening groove 63A. For example, as illustrated in FIG. 2, when the tire cover 50 is detached from the tire 20, the rim accommodating portion 65A is formed such that the separation width W1 of the rim accommodating portion 65A is equal to the width W2 of the side walls 35 and 35 of the rim 32.

As illustrated in FIG. 3, the tire 20 is accommodated in the tire accommodating portion 64A of the cover piece 60A. The rim 32 of the wheel 30 is accommodated in the rim accommodating portion 65A of the cover piece 60A. For example, half or more of the side wall 35 of the rim 32 is covered with the rim accommodating portion 65A.

When the air amount of the tire 20 is not sufficient, the tire 20 maybe insufficiently held by the tire cover 50. Accordingly, in addition to the tire 20, the rim 32 is accommodated in the tire cover 50. As a result, detachment of the tire cover 50 from the tire 20 is suppressed.

As illustrated in FIG. 2, the sliding surface 71A and the friction surface 73A are formed on the inner surface 66A of the opening groove 63A. For example, the sliding surface 71A is disposed closer to the open end of the opening groove 63A than the friction surface 73A. The friction surface 73A is disposed at a position farther from the open end of the opening groove 63A than the sliding surface 71A. For example, the friction surface 73A is disposed on the bottom surface of the opening groove 63A.

The friction surface 73A has a higher coefficient of friction than the sliding surface 71A. For example, the sliding layer 70A is disposed on the inner surface 66A of the opening groove 63A. The surface of the sliding layer 70A becomes a sliding surface 71A. The sliding layer 70A is made of, for example, Teflon (registered trademark) tape.

The friction layer 72A is disposed on the inner surface 66A of the opening groove 63A. The surface of the friction layer 72A becomes a friction surface 73A. The friction layer 72A is made of, for example, anti-slip tape. The anti-slip tape includes a sheet-shaped base material and abrasive grains. The abrasive grains are dispersed and disposed on the surface of the base material. The friction surface 73A may have an uneven structure. Further, an adhesive may be applied to the friction surface 73A.

The sliding layer 70A and the sliding surface 71A are arranged, for example, over the entire region of the rim accommodating portion 65A. Further, the sliding layer 70A and the sliding surface 71A may extend to a portion of the tire accommodating portion 64A.

The friction layer 72A and the friction surface 73A are disposed in a region of the inner surface 66A of the cover piece 60A facing the ground contact surface 23 of the casing 22. That is, the friction surface 73A is formed at a position where the tire 20 comes into contact with the ground contact surface 23 that exerts a grip force on the ground.

By setting the sliding surface 71A near the opening end of the opening groove 63A, the cover piece 60A can be smoothly attached to the tire 20. Further, the contact between the ground contact surface 23 of the tire 20 and the friction surface 73A of the cover piece 60A makes it possible to suppress the idle rotation of the tire 20 with respect to the tire cover 50.

Coupling of Cover Pieces

As illustrated in FIG. 1, the sum of the arc lengths of the cover pieces 60A and 60B exceeds the entire circumference of the tire 20. The diameters of the cover pieces 60A and 60B are substantially equal to the diameter of the tire 20. The sum of the arc angle of the cover piece 60A and the arc angle of the cover piece 60B exceeds 360° . In such a structure, when the cover pieces 60A and 60B are mounted on the tire 20, circumferential end portions of the cover pieces 60A and 60B overlap each other.

Figure 4:
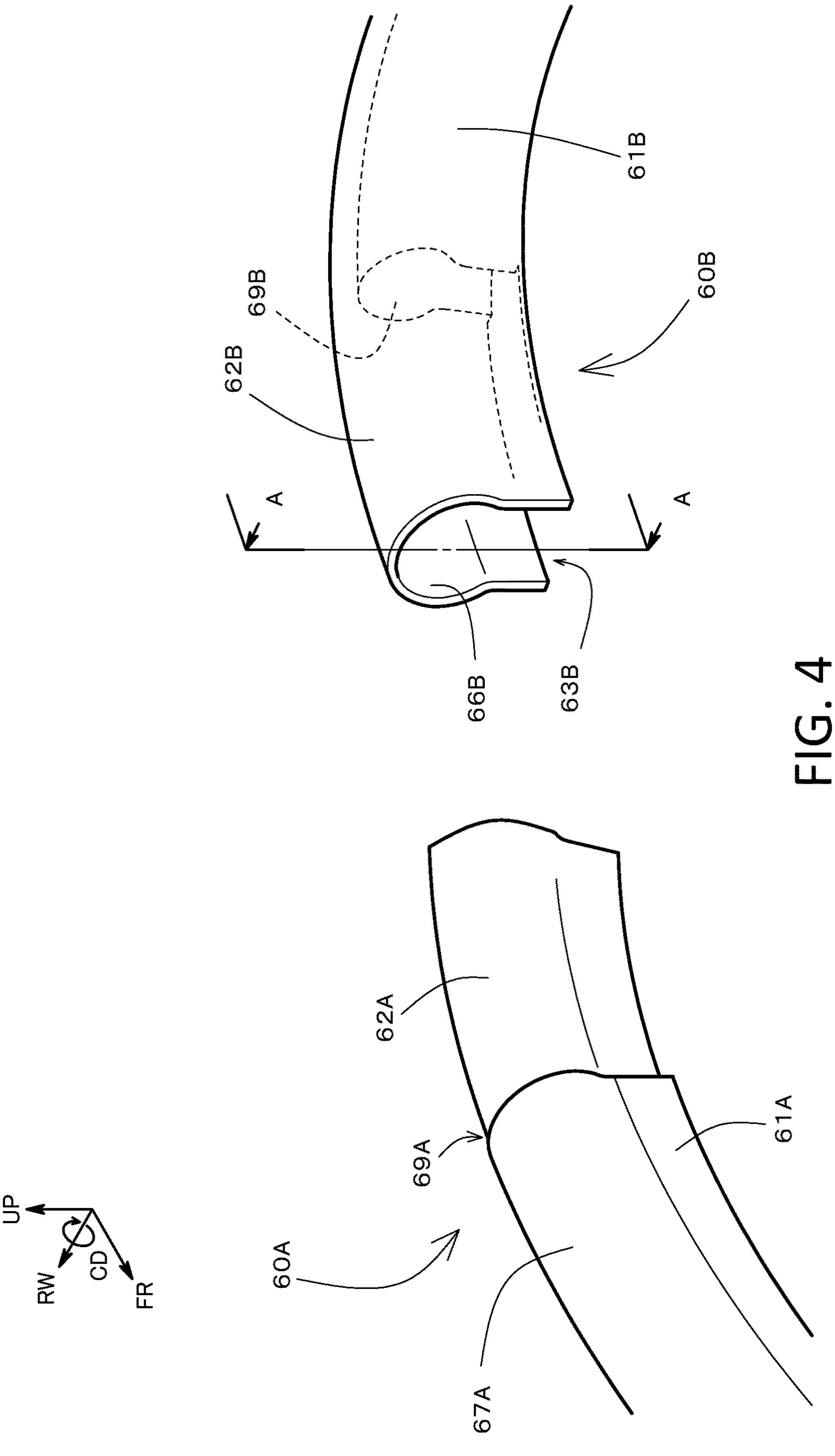
FIG. 4 is a diagram illustrating a joint portion of a cover piece.

As illustrated in FIGS. 1 and 4, the cover pieces 60A and 60B include main body portions 61A and 61B and joint portions 62A and 62B. The body portions 61A and 61B extend in the circumferential direction. The joint portions 62A and 62B are disposed at both circumferential ends of the body portions 61A and 61B.

When the cover pieces 60A and 60B are mounted on the tire 20, the joint portions 62A and 62B are overlapped, for example, the joint portions 62A and 62B are thinner than the body portions 61A and 61B. Such a structure reduces the difference in thickness between the overlapped joint portions 62A and 62B and the body portions 61A and 61B. As a result, in a state where the tire cover 50 is attached to the tire 20, the bump is suppressed.

Referring to FIG. 4, for example, joint portion 62A is a male joint. The joint portion 62B is a female joint. That is, the outer peripheral side of the joint portion 62A is thin. Further, the inner peripheral side of the joint portion 62B is thin. Thus, in the joint portion 62A, a step 69A is formed on the outer surface 67A of the cover piece 60A. The step 69A is a boundary between the joint portion 62A and the body portion 61A. In the joint portion 62B, a step 69B is formed on the inner surface 66B of the cover piece 60B. The step 69B is a boundary between the joint portion 62B and the body portion 61B.

Figure 5:
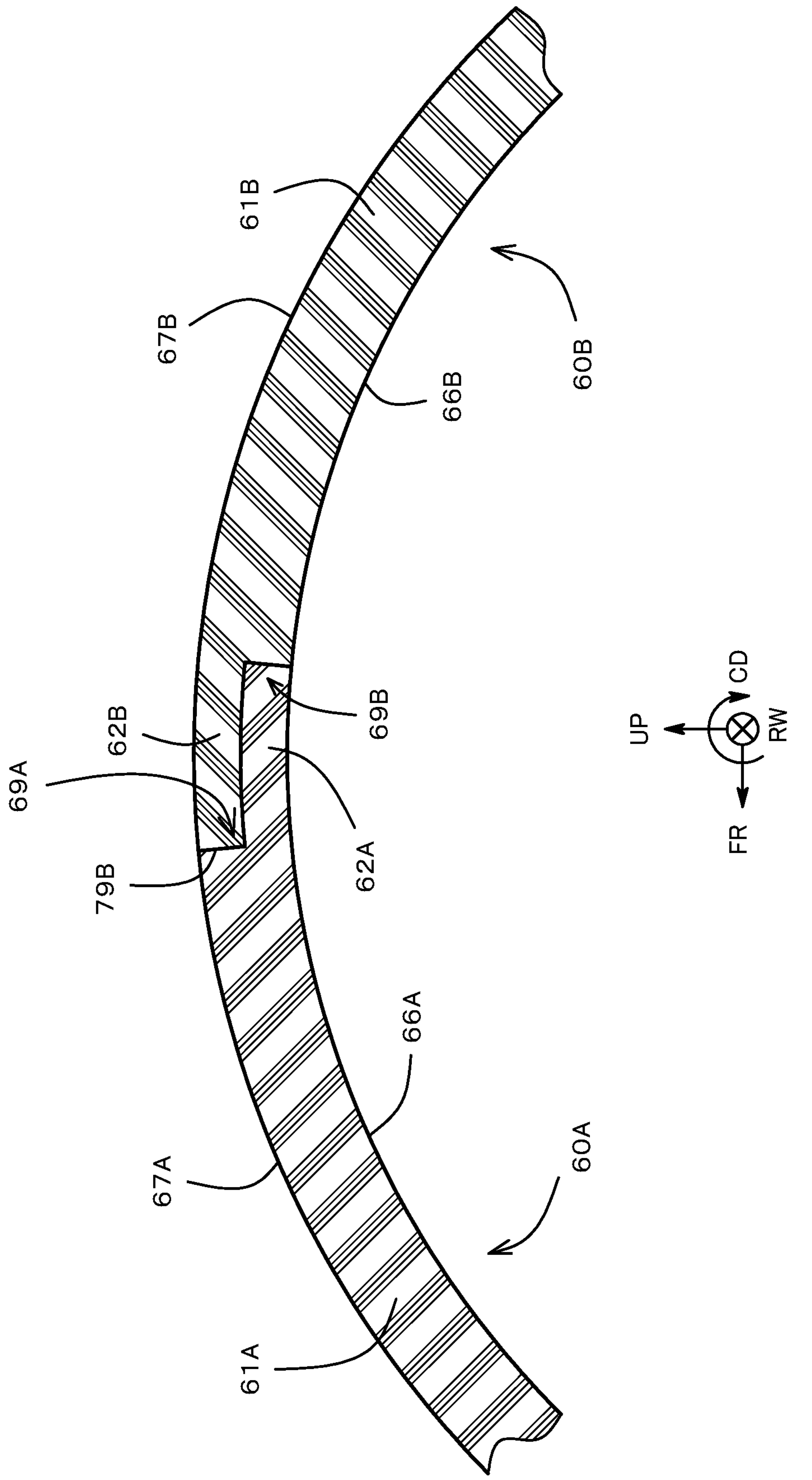
FIG. 5 is a cross-sectional view taken along line A-A of FIG. 4. This figure illustrates the structure of the bottom wall portion of the opening groove.

When the tire 20 is mounted, the joint portion 62A is covered with the joint portion 62B. At this time, as illustrated in FIG. 5, the steps 69A and 69B can be used to align the cover pieces 60A and 60B in the circumferential direction. For example, the cover piece 60B is slid along the circumferential direction until the end surface 79B of the joint portion 62B abuts against the step 69A.

Figure 6:
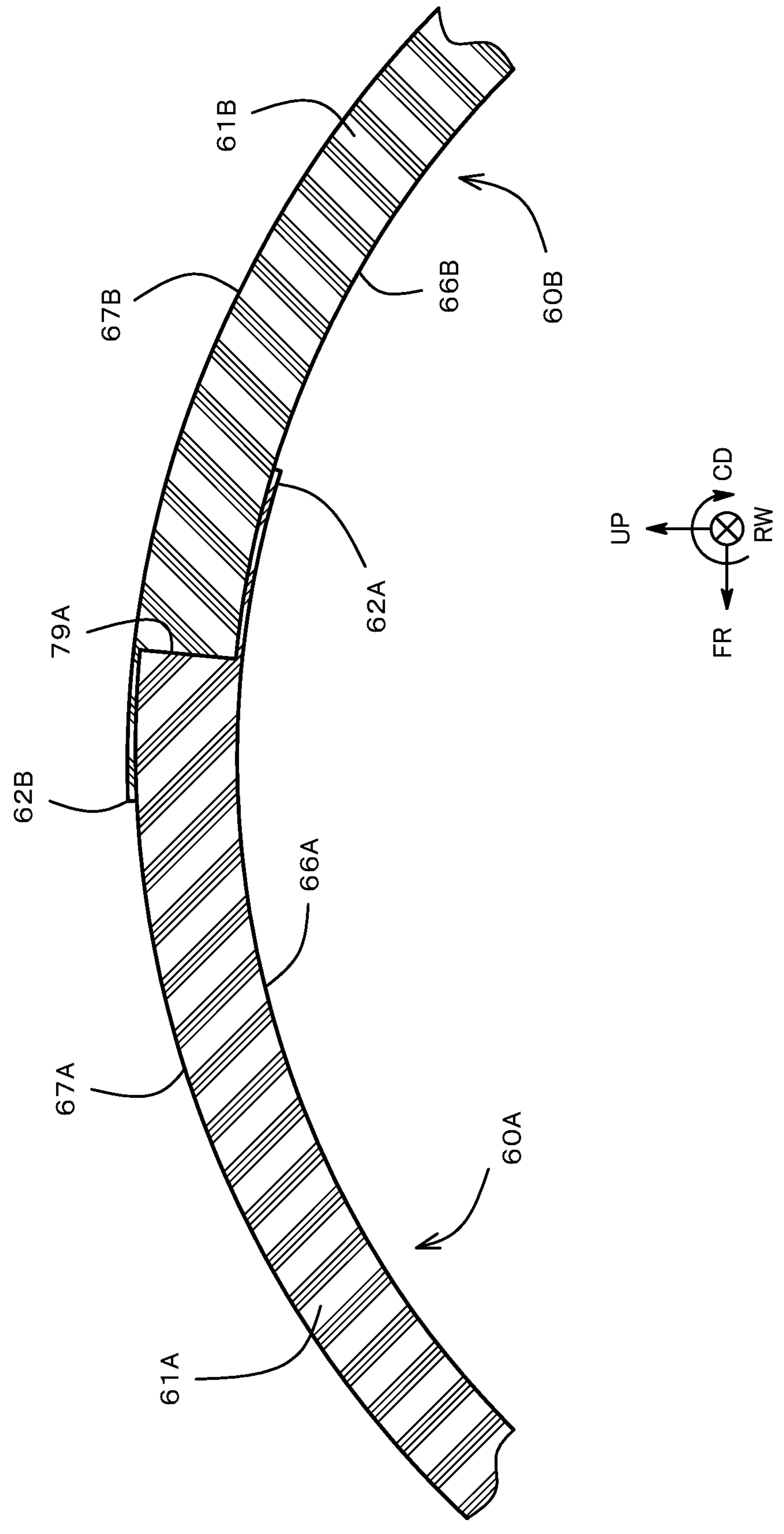
FIG. 6 is a cross-sectional view taken along the line A-A showing the first modification of FIG. 5.

As illustrated in FIG. 6, the thickness of the joint portions 62A and 62B may be significantly smaller than that of the body portions 61A and 61B. For example, the thickness of the joint portions 62A and 62B is determined within a range of 1% or more and 10% or less of the thickness of the body portions 61A and 61B. By reducing the thickness of the joint portions 62A and 62B, during traveling in a state where the tire cover 50 is attached to the tire 20, the bump is suppressed. Cover piece 60B includes an end surface 79A.

Figure 7:
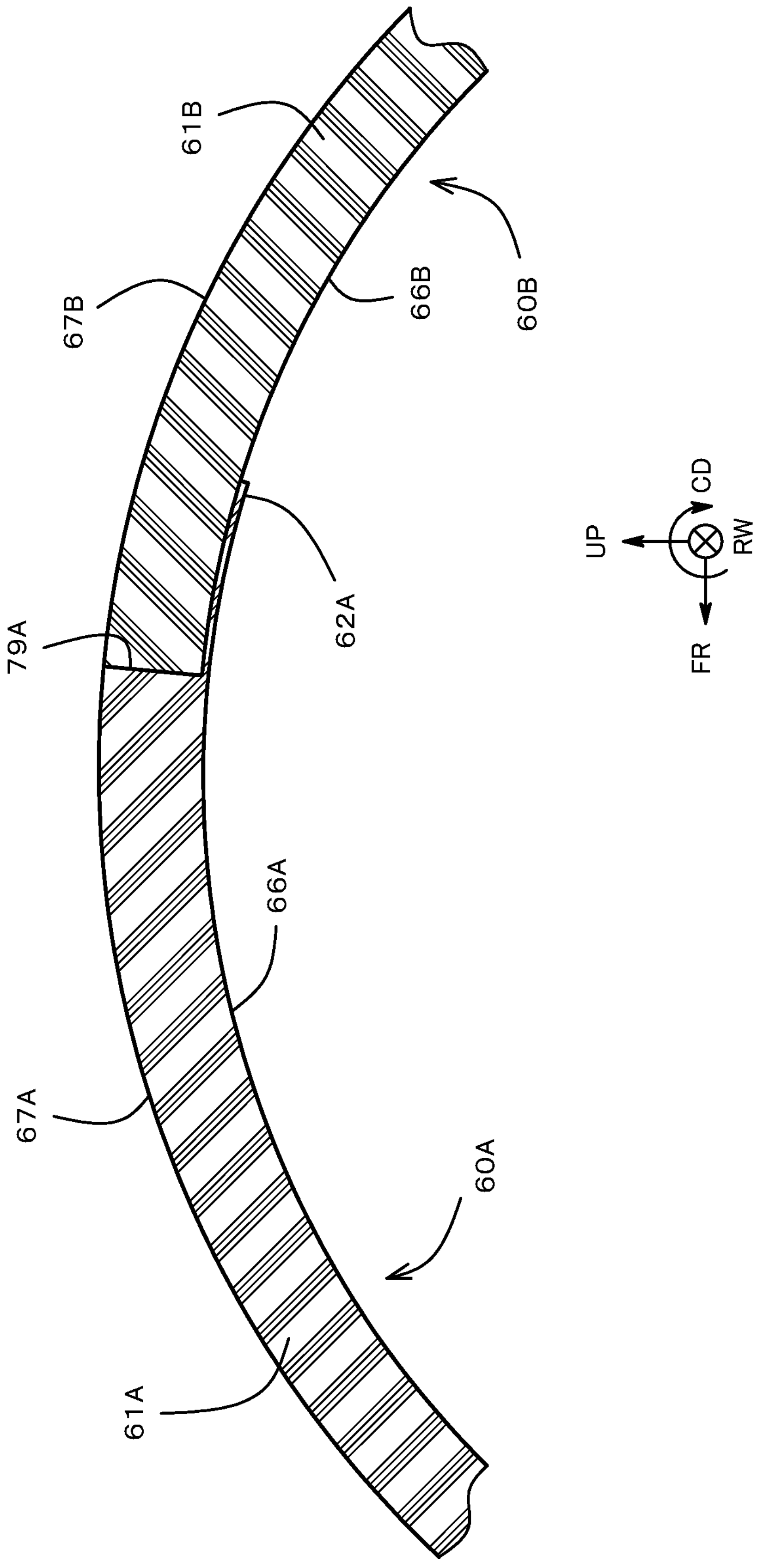
FIG. 7 is a cross-sectional view taken along the line A-A showing the second modification of FIG. 5.

Further, as illustrated in FIG. 7, the joint portion 62A may be disposed only on the cover piece 60A. In this case, the joint portion is omitted from the cover piece 60B.

Figure 8:
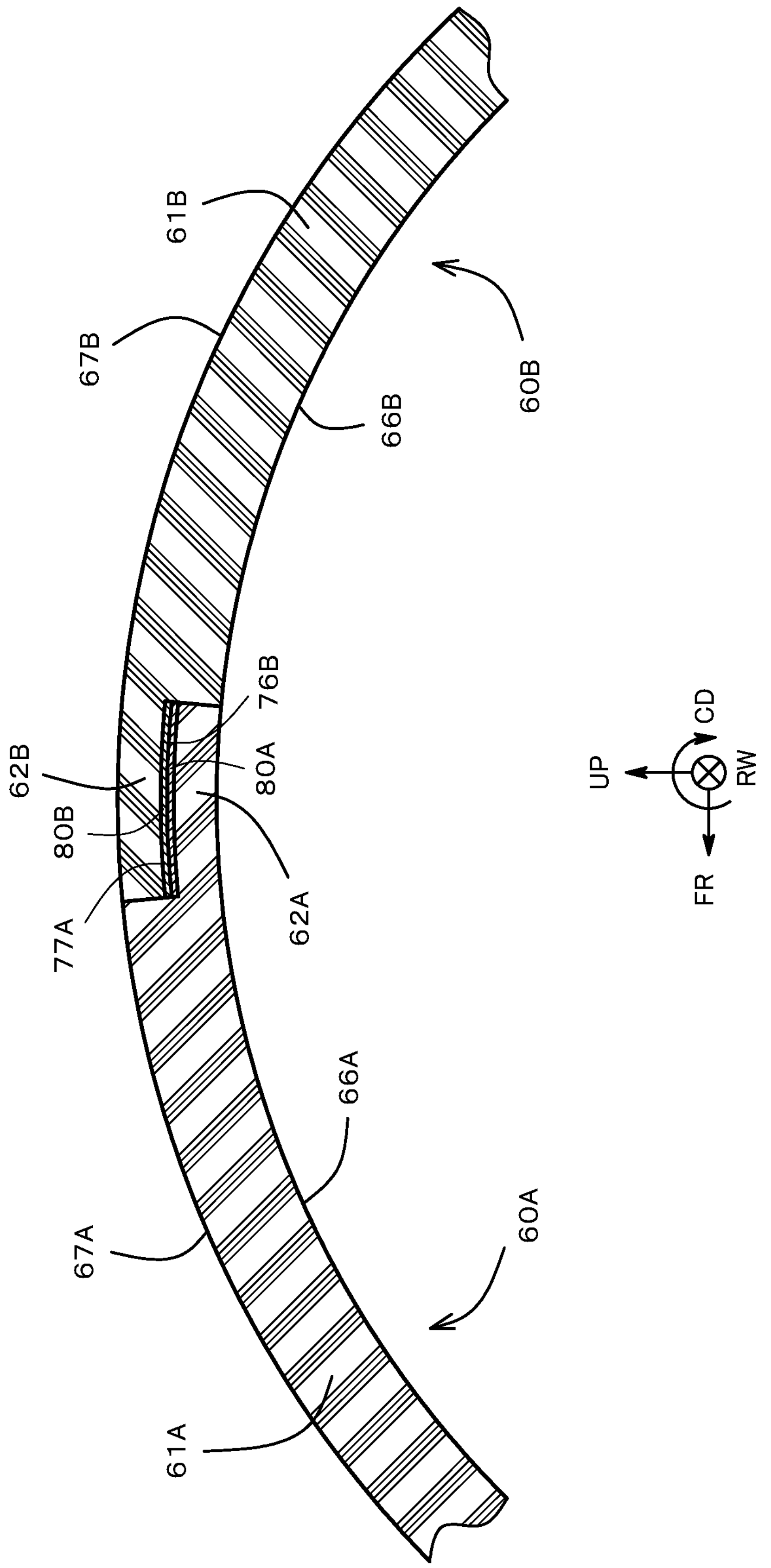
FIG. 8 is a cross-sectional view taken along the line A-A shows the third modification of FIG. 5.

Further, as illustrated in FIG. 8, the fastening components 80A and 80B may be disposed in the joint portions 62A and 62B. For example, in the joint portion 62A which is a male component, the fastening component 80A is disposed on the outer surface 77A. Further, in the joint portion 62B which is a female component, the fastening component 80B is disposed on the inner surface 76B. The fastening components 80A and 80B are, for example, surface fasteners or magnet sheets. When the cover pieces 60A and 60B are mounted on the tire 20, the fastening components 80A and 80B are fastened to each other. This suppresses the displacement of the cover pieces 60A and 60B in the circumferential direction.

Mounting Process of Tire Cover

Figure 9:
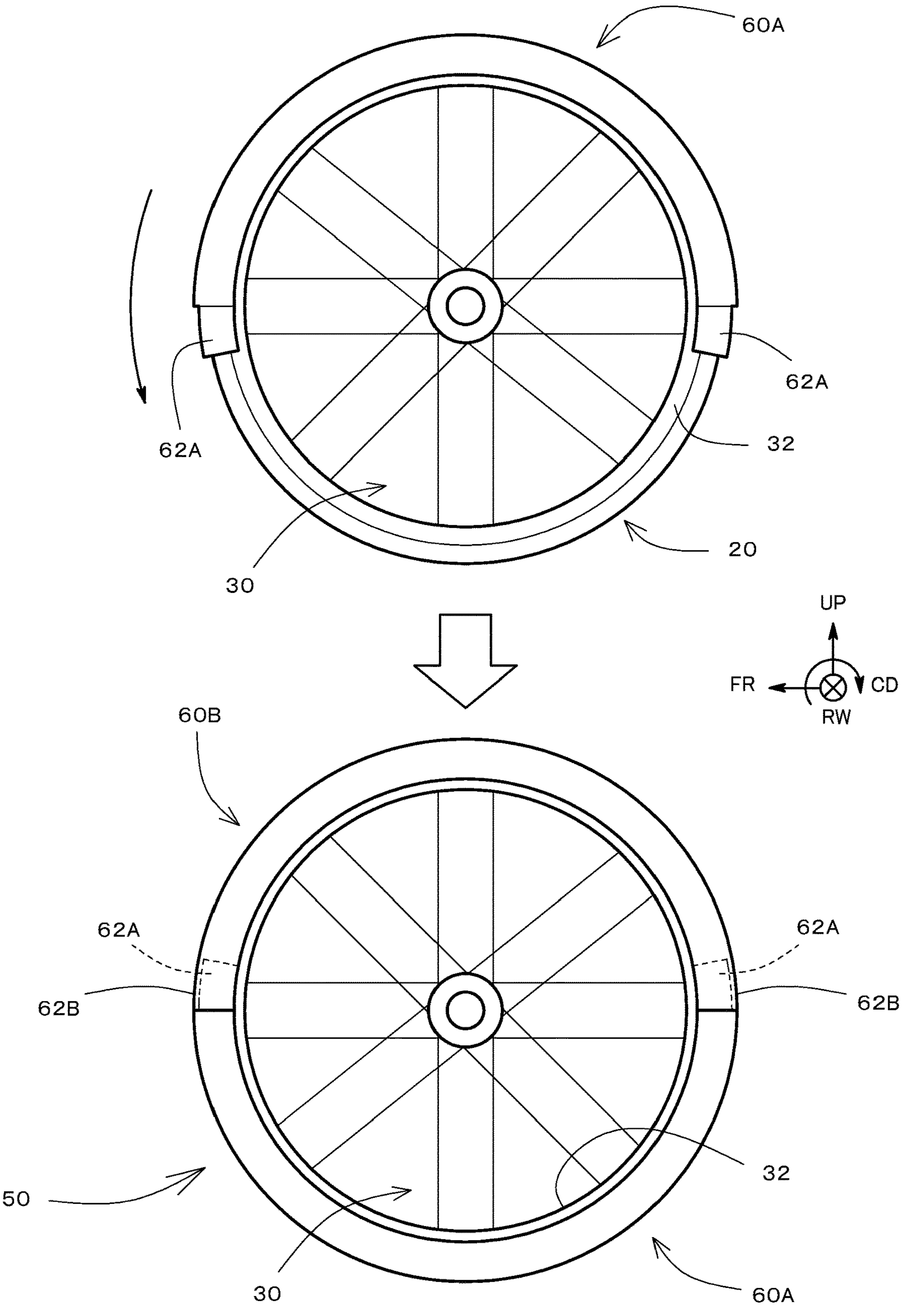
FIG. 9 shows an example of a process of mounting a wheelchair tire cover according to the present embodiment to a wheelchair tire.

FIG. 9 shows an example in which the tire cover 50 is attached to the tire 20. The cover piece 60A is mounted on the upper half of the tire 20. In this mounting process, the sliding surface 71A (see FIG. 2) of the cover piece 60A comes into contact with the casing 22 of the tire 20. Then, the sliding surface 71A slides on the casing 22, and the tire 20 is covered with the cover piece 60A.

The tire 20 is then rotated by 180°. For example, in a state where the cover piece 60A covers the tire 20, the wheelchair 10 moves forward by 0.5 rotation of the tire 20.

Thereafter, as illustrated in the lower part of FIG. 9, the cover piece 60B is attached to the upper half of the tire 20. Similarly to the cover piece 60A described above, the sliding surface 71B allows the cover piece 60B to smoothly cover the tire 20. Finally, the circumferential position is adjusted so that the joint portions 62A and 62B overlap each other. Thus, the tire 20 is covered with the tire cover 50 over the entire circumference. The present disclosure is not limited to the present embodiments described above, and includes all changes and modifications without departing from the technical scope or the essence of the present disclosure defined by the claims.

The invention claimed is:

1. A tire cover for a wheelchair, the tire cover covering a tire of the wheelchair from outside in a radial direction, the tire cover comprising:

a plurality of cover pieces, each of which has an arc shape; wherein an opening groove is formed on an inner circumferential side of each of the plurality of cover pieces;

the opening groove extends along a circumferential direction, and the opening groove accommodates the tire;

a sliding surface and a friction surface are formed on an inner surface of the opening groove;

the sliding surface is formed by a sliding layer disposed near an opening end;

the friction surface is formed by a friction layer disposed on a bottom surface of the opening groove such that the sliding surface is nearer to the opening end than the friction surface is to the opening end; and the friction surface has a higher coefficient of friction than the sliding surface.

2. The tire cover for the wheelchair according to claim 1, wherein a sum of arc lengths of the plurality of cover pieces exceeds a circumferential length of the tire;

each of the plurality of cover pieces comprises a body portion and two joint portions;

the body portion extends in the circumferential direction;

the two joint portions are disposed at respective circumferential ends of the body portion;

the joint portion of a first cover piece and the joint portion of a second cover piece are overlapped and attached to the tire; and the joint portions of the first cover piece and the second cover piece are thinner than the body portions of the first cover piece and the second cover piece.

3. The tire cover for the wheelchair according to claim 2, wherein a step between the body portion and the joint portion is formed on an outer surface of the first cover piece; and a step between the body portion and the joint portion is formed on an inner surface of the second cover piece.

4. The tire cover for the wheelchair according to claim 3, wherein a plurality of fasteners are disposed on an outer surface of the joint portion of the first cover piece and an inner surface of the joint portion of the second cover piece, respectively.

5. The tire cover for the wheelchair according to claim 2, wherein the joint portion of the first cover piece is a male joint and the joint portion of the second cover piece is a female joint.

6. The tire cover for the wheelchair according to claim 5, wherein the tire is disposed within the male joint and the female joint.

7. The tire cover for the wheelchair according to claim 6, wherein the male joint and the female joint each include a tire accommodating portion and a rim accommodating portion, a cross-sectional shape of the tire accommodating portion is an arc shape, the cross-sectional shape is perpendicular to the circumferential direction of the opening groove, and the rim accommodating portion extends linearly from an end of the tire accommodating portion to the opening end.

8. The tire cover for the wheelchair according to claim 1, wherein the opening groove comprises a tire accommodating portion and a rim accommodating portion;

a cross-sectional shape of the tire accommodating portion is an arc shape, and the cross-sectional shape is perpendicular to the circumferential direction of the opening groove; and the rim accommodating portion extends linearly from an end of the tire accommodating portion to the opening end.

9. The tire cover for the wheelchair according to claim 8, wherein the tire cover terminates at the opening end.

10. The tire cover for the wheelchair according to claim 1, wherein the sliding layer and the friction layer are both fixed to the inner surface of the opening groove.

* * * * *